US011042462B2

(12) United States Patent
Sofia et al.

(10) Patent No.: US 11,042,462 B2
(45) Date of Patent: Jun. 22, 2021

(54) FILTERING BASED ON INSTRUCTION EXECUTION CHARACTERISTICS FOR ASSESSING PROGRAM PERFORMANCE

(71) Applicant: International Business Machines Corporation, Armonk, NY (US)

(72) Inventors: Anthony Thomas Sofia, Hopewell-Junction, NY (US); Peter Sutton, Lagrangeville, NY (US); Robert W. St. John, Hyde Park, NY (US); Matthias Klein, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/559,999

(22) Filed: Sep. 4, 2019

(65) Prior Publication Data

US 2021/0064504 A1    Mar. 4, 2021

(51) Int. Cl.
| | |
|---|---|
| *G06F 9/34* | (2018.01) |
| *G06F 9/54* | (2006.01) |
| *G06F 11/34* | (2006.01) |
| *G06F 9/32* | (2018.01) |
| *G06F 11/07* | (2006.01) |

(52) U.S. Cl.
CPC .......... *G06F 11/3409* (2013.01); *G06F 9/321* (2013.01); *G06F 9/545* (2013.01); *G06F 9/324* (2013.01); *G06F 11/0763* (2013.01); *G06F 11/3457* (2013.01); *G06F 11/3466* (2013.01)

(58) Field of Classification Search
CPC ...... G06F 9/321; G06F 9/324; G06F 11/3466; G06F 9/3644; G06F 9/3409; G06F 11/3457; G06F 11/0763; G06F 9/54; G06F 9/545
USPC ........ 717/127, 128, 131, 135; 712/203, 226, 712/227, 245, 248; 714/47.2
See application file for complete search history.

(56) References Cited

U.S. PATENT DOCUMENTS

| | | | |
|---|---|---|---|
| 7,353,445 B1 * | 4/2008 | Barreh | ................ G06F 11/1064 |
| | | | 711/125 |
| 8,572,748 B2 | 10/2013 | Pistoia et al. | |
| 9,063,754 B2 | 6/2015 | Felch | |
| 9,336,115 B1 | 5/2016 | Bienkowski et al. | |
| 9,753,731 B1 | 9/2017 | Puzovic | |

(Continued)

OTHER PUBLICATIONS

Klosowski, Thorin "How Facebook Uses Your Data to Target ads, Even Offline", retrieved https://lifehacker.com/how-facebook-uses-your-data-to-target-ads-even-offline-5994380; dated Apr. 11, 2013; 16 pgs.

*Primary Examiner* — Daniel H Pan
(74) *Attorney, Agent, or Firm* — Cantor Colburn LLP; Teddi Maranzano

(57) ABSTRACT

Identifying computer program execution characteristics for determine relevance of pattern instruction executions to determine characteristics of a computer program. Filters are utilized to determine which subsequent occurrences of execution of at least one computer instruction are relevant to a counter based on execution characteristics of the at least one computer instruction where the counter counts the subsequent occurrences of execution of at least one computer instruction following prior executions of the same at least one computer instruction.

12 Claims, 4 Drawing Sheets

(56) References Cited

U.S. PATENT DOCUMENTS

| | | | | |
|---|---|---|---|---|
| 2007/0226472 A1* | 9/2007 | Chaudhry | ............ | G06F 9/3867 |
| | | | | 712/227 |
| 2012/0084537 A1* | 4/2012 | Indukuru | ............ | G06F 12/0862 |
| | | | | 712/227 |
| 2015/0058997 A1* | 2/2015 | Lee | .................... | G06F 21/6281 |
| | | | | 726/26 |
| 2017/0277540 A1* | 9/2017 | Hanaki | .................. | G06F 9/321 |

\* cited by examiner

FILTERING BASED ON INSTRUCTION EXECUTION CHARACTERISTICS FOR ASSESSING PROGRAM PERFORMANCE

BACKGROUND

The invention relates generally to tracking usage of specific computer instructions and, more particularly, utilizing filtering in association with a counter to determine whether rapid pattern execution of a computer instruction is relevant.

Determining the performance characteristics of a computer program requires detailed analysis of the computer instructions that are being executed. Typically, a counter keeps count of what computer instructions are being executed by the computer program. However, in some situations, performance cannot actually be determined by a single computer instruction and a counter. Even rapid use of computer instructions cannot be determined using sampling techniques because the time between samples tends to be larger than the frequency that would be required to detect irregular conditions. Thus, what is needed is tracking of computer instructions repeatedly executed within a threshold time period along with filtering in order to isolate specific types of computer programs.

SUMMARY

According to a non-limiting embodiment, a computer implemented method for determining characteristics of a computer program by identifying execution characteristics of computer instructions is provided. The method includes determining which subsequent occurrences of execution of at least one computer instruction are relevant to a counter based on execution characteristics of the at least one computer instruction. The method also includes counting the subsequent occurrences of execution of at least one computer instruction following prior executions of the same at least one computer instruction.

According to another non-limiting embodiment, a computer system for determining characteristics of a computer program by identifying execution characteristics of computer instructions is provided. The computer system includes at least one filter for determining which subsequent occurrences of execution of at least one computer instruction are relevant to a counter based on execution characteristics of the at least one computer instruction. The computer system also includes a counter for counting the subsequent occurrences of execution of at least one computer instruction following prior executions of the same at least one computer instruction.

According to yet another non-limiting embodiment, a computer program product is provided. The computer program product includes a computer readable storage medium having program instructions embodied therewith, the program instructions executable by a computer processor to cause the computer processor to perform a method for determining characteristics of a computer program by identifying execution characteristics of computer instructions. A non-limiting example of the method includes determining which subsequent occurrences of execution of at least one computer instruction are relevant to a counter based on execution characteristics of the at least one computer instruction. The method also includes counting the subsequent occurrences of execution of at least one computer instruction following prior executions of the same at least one computer instruction and performing one of the following: filtering out via at least one filter a count of the subsequent occurrences of execution of at least one computer instruction by the counter based on the execution characteristics of the at least one computer instruction not being relevant, or via the at least one filter, initiating counting by the counter of the subsequent occurrences of execution of at least one computer instruction based on the execution characteristics of the at least one computer instruction being relevant. The method then includes where a subsequent occurrence of execution of at least one computer instruction occurs within a threshold time period relative a prior execution of the at least one computer instruction, wherein determining which subsequent occurrences of execution of at least one computer instruction are relevant to the counter based on execution characteristics of the at least one computer instruction comprises filtering via a first filter based on an execution mode of the at least one computer instruction and filtering via second filter based on where the at least one computer instruction is fetched from.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
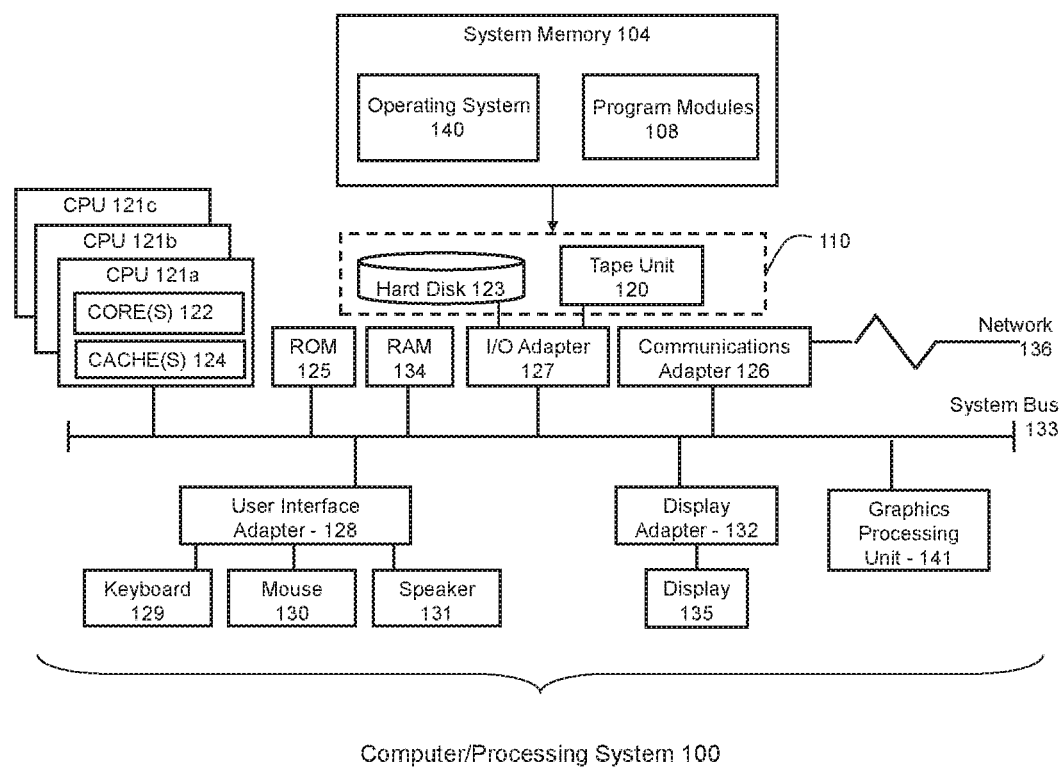
FIG. 1 is a block diagram illustrating a computer system for determining characteristics of a computer program by identifying execution characteristics of computer instructions in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring now to FIG. 1, a computer system 100 is illustrated according to a non-limiting embodiment. In FIG. 1 the computer system 100 is shown in the form of a general-purpose computer device which also may be referred to as a processing device. In some embodiments, the computer system 100 may be a management server, a web server, laptop computer, tablet computer, netbook computer, personal computer (PC), a desktop computer, or any programmable electronic device capable of receiving and sending data and processing program instructions.

The components of computer system 100 may include, but are not limited to, one or more central processing units (CPUs) 121a, 121b, 121c, etc. (collectively or generically referred to as processor(s) 121). In one or more embodiments, each processor 121 includes one or more cores 122 and one or more caches 124. There may be any number of cores with each processor 121. Also, each processor 121 may include any number of cache levels operatively connected to one another. Processors 121 are coupled to system memory (RAM) 134 and various other components via a system bus 133. Read only memory (ROM) 125 is coupled to the system bus 133 and may include a basic input/output system (BIOS), which controls certain basic functions of computer system 100.

Cache 124, for example, may have 1 to N congruence classes (rows) and 1 to N sets (columns) as understood by those skilled in the art. Each congruence class can also be referred to as an addressable index and each set can be referred to as a compartment. Cache 124 has numerous memory elements or cells where each memory element stores data. Cache 124 preferably is a fast memory that enhances the performance of the processor 121 by holding recently accessed data, and data near accessed data, from RAM 134. Although cache 124 is depicted as on-processor cache, one or more caches may be off-processor cache. Data retrieved from RAM 134 may be cached in any of the caches. Typically, the cache size increases as the cache level increases while the speed at which data can be accessed decreases as the cache level increases, primarily because lower level caches are located close to core 122 and/or processor 121. Thus, it should be understood that different cache arrangements, in both a number of cache levels and location within the system, are recognized by embodiments of the present invention. Further, some cache levels may be dedicated to a core 122, while other cache levels may be shared between multiple cores 122 of a processor 121.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 120 or any other similar component. I/O adapter 127, hard disk 123, and tape storage device 120 are collectively referred to herein as mass storage 110.

Depending on the configuration and type of computer system 100, system memory 104 includes, but is not limited to, volatile storage (e.g., random access memory), non-volatile storage (e.g., read-only memory), flash memory, or any combination of such memories. According to an aspect, the system memory 104 includes an operating system 140 and one or more program modules 108 for execution by one or more processors 121 via the caches 124. Operating system 140 for execution on the processing system 100 may be stored in mass storage 110. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 110, input means such as keyboard 129 and mouse 130, and output capability including speaker 131 and display 135. In one embodiment, a portion of RAM 134 and mass storage 110 collectively store the operating system 140 to coordinate the functions of the various components shown in FIG. 1.

Figure 2A:
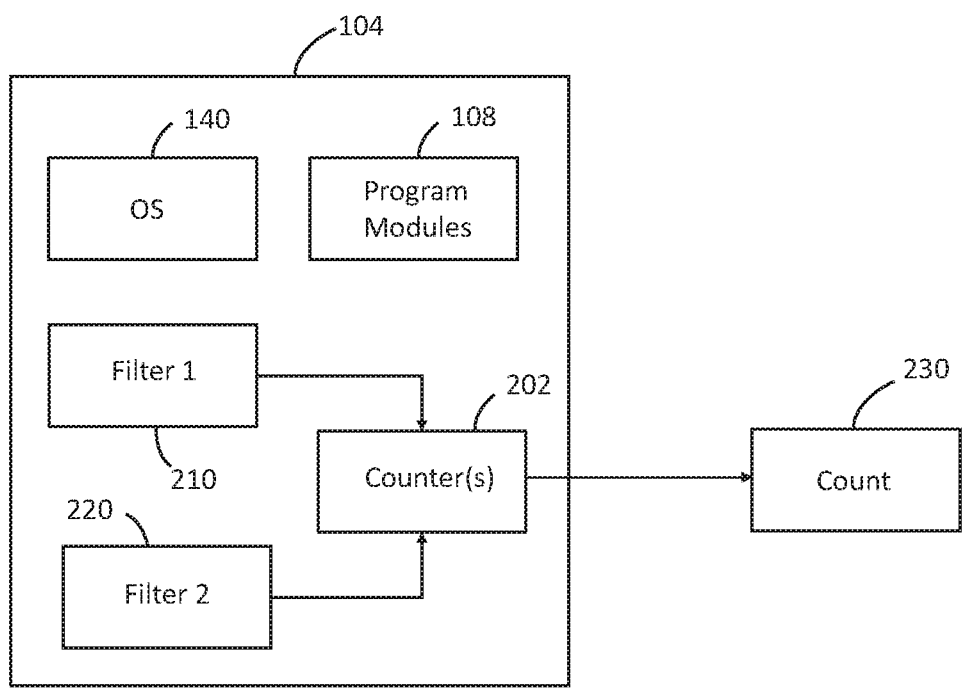
FIGS. 2A and 2B are block diagrams illustrating different embodiments of the system memory of the computer system of FIG. 1 according to one or more embodiments of the present invention.
Figure 2B:
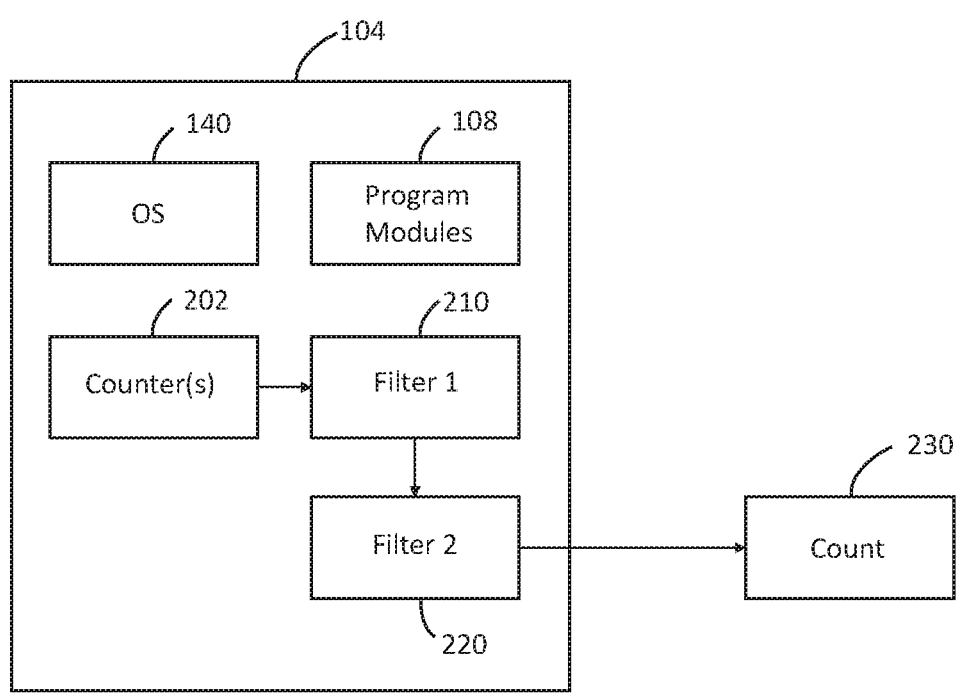

FIGS. 2A and 2B illustrate different detailed embodiments of the system memory 104 of the computer system 100 of FIG. 1 according to one or more embodiments of the present invention. As shown in FIGS. 2A and 2B, in addition to the OS 140 and the program modules 108, the system memory 104 includes one or more counters 202 for implementing one or more embodiments described herein. The counter 202, sometimes referred to as a program counter or an instruction pointer, can be implemented in software. However, in one or more embodiments the counter 202 may be implemented in hardware. The computer instruction or the set of computer instructions to be counted by the counter 202 are specified by a user, software developer, or IT professional.

Referring now to FIG. 2A, the system memory 104 also includes one or more filters such as filters 210, 220 which operate to initiate counting by the counter 202 of the subsequent occurrences of execution of at least one computer instruction based on the execution characteristics of the at least one computer instruction. For example, the first filter 210 filters subsequent occurrences of the computer instruction or set of computer instructions based on an execution mode of the at least one computer instruction. In one or more embodiments, the execution mode of the computer instruction or set of computer instructions may be architecture specific. For example, in some executing environments, some computer instructions have modes such as a kernel mode or a user mode in a Linux environment, supervisor state or problem state in a mainframe environment, or keys such as in IBM's z/OS environment. The different keys dictate what memory access can be performed.

Thus, in order to determine which repeated computer instruction events are relevant for analysis purposes, some events of repeated computer instructions can be filtered out based on the execution mode of an environment as not being relevant to the counter 202 and, therefore, the subsequent occurrences of the computer instruction or set of computer instruction would not be counted. In one or more embodiments, the filter 210 filters out patterns of OS system level code from user application code. For example, the filter 210 filters out code in kernel mode from code in user mode, code in supervisor state from code if problem state, or filters out code executing in a mode pursuant to a particular key from code executing pursuant to one or more other keys.

As shown in FIG. 2A, the system memory 104 may also include a second filter 220 for filtering based on where the at least one computer instruction is fetched from. In one or more embodiments, the second filter 220 filters based on where the at least one computer instruction is fetched from in tagged memory. The system memory 104 and/or the cache 124 may be defined by multiple tagged pages where the filter 220 takes into account the page where the particular computer instruction or set of computer instructions is fetched from. Each page of memory may be tagged with a particular key based on how the memory was allocated. The memory pages allocated for OS code are tagged differently than memory pages allocated for user application code which allows the filter 220 to filter out rapid subsequent occurrences of OS system level code from the rapid subsequent occurrence of relevant user application code. In other words, when there is rapid execution of subsequent occurrences of at least one instruction, the filter 220 filters out OS system level code from relevant user application code based on where the code was fetched from in memory.

Thus, if a particular at least one computer instruction is relevant pursuant to the filters 210, 220, the counter initiates counting to generate a count 230 of subsequent occurrences of execution of the at least one computer instruction as a result of the execution characteristics of the at least one computer instruction. The count 230 of the counter 202 is incremented each time the particular at least one computer instruction or group of computer instructions is fetched from the system memory 104 or the cache 124 and subsequently executed following the prior execution of that same computer instruction or set of computer instructions.

In one or more embodiments, the counter 202 counts the subsequent execution of the at least one computer instruction when occurring within a threshold such as a threshold time period relative a prior execution of the at least one corner instruction. In other words, the counter 202 counts each occurrence of the at least one computer instruction executing within a threshold time period of itself. The particular instruction may repeat itself once or, in one or more other embodiments, a particular instruction or set of instructions may repeat itself several times within the threshold time period. For example, the threshold when determining whether there is a subsequent rapid execution of a particular computer instruction or a set of computer instructions may be defined, for example, based on whether there is an instruction or a set of instructions that is repeated at least once within a time period such as a number of milliseconds or occurring within a particular number of clock cycles of the CPU 121.

Referring now to FIG. 2B, the counter 202 and the filters 210, 220 may be arranged to operate differently within the system memory 104 of the computer system 100 in order to analyze the computer program. In such case, the counter 202 may first count each subsequent occurrence of execution of a particular computer instruction or set of computer instructions. Once the count is generated by the counter 202, the filters 210, 220 then operate to filter out the generated count of the subsequent occurrences of execution of the at least one computer instruction by the counter when not relevant based on the execution characteristics of the at least one computer instruction as described above. If relevant, the count 230 is output and maintained in a software area for further analysis as shown in FIG. 2B.

Figure 3:
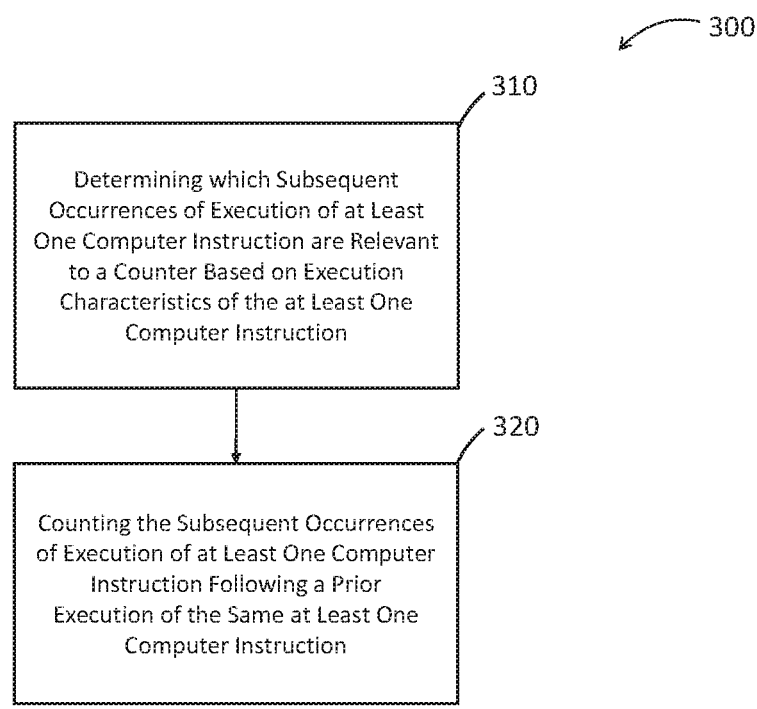
FIG. 3 is a flow diagram illustrating a method for determining characteristics of a computer program by identifying execution characteristics of computer instructions according to one or more embodiments of the present invention.

Turning now to FIG. 3, a computer implemented method 300 for determining characteristics of a computer program by identifying execution characteristics of computer instructions is illustrated according to a non-limiting embodiment. The flow diagram of FIG. 3 illustrates the method 300 that includes process block 310 for determining which subsequent occurrences of execution of at least one computer instruction are relevant to a counter based on execution characteristics of the at least one computer instruction. The method 300 also includes process block 320 for counting the subsequent occurrences of execution of at least one computer instruction following prior executions of the same at least one computer instruction.

The computer implemented method 300 may also include one or more other process blocks. In one or more embodiments, the method 300 can include where the at least one computer instruction is a set of computer instructions. The method 300 may also further comprise performing one of the following: filtering out via at least one filter a count of the subsequent occurrences of execution of at least one computer instruction by the counter based on the execution characteristics of the at least one computer instruction not being relevant; or via the at least one filter, initiating counting by the counter of the subsequent occurrences of execution of at least one computer instruction based on the execution characteristics of the at least one computer instruction being relevant. The method 300 can include where a subsequent occurrence of execution of at least one computer instruction occurs within a threshold relative a prior execution of the at least one computer instruction. The method 300 can also include where the threshold is a threshold time period following the prior execution of the at least one computer instruction.

The method 300 may further comprise filtering via a first filter based on an execution mode of the at least one computer instruction. The execution mode of the at least one computer instruction may be architecture specific. The method 300 may also further comprises filtering via second filter based on where the at least one computer instruction is fetched from. The second filter may filter based on where the at least one computer instruction is fetched from in tagged memory.

The present invention may be a system, a computer implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining characteristics of a computer program by identifying execution characteristics of computer instructions, comprising:
    identifying a set of computer instructions;
    identifying an execution of at least one computer instruction of the set of computer instructions;
    determining which subsequent occurrences of execution of computer instructions in the set of computer instructions that are relevant to a counter based on execution characteristics of the computer instructions; and
    counting the subsequent occurrences of execution of each of the computer instructions in the set of computer instruction that were determined to be relevant following the executions of the at least one computer instruction,
    wherein determining which subsequent occurrences of execution of computer instructions in the set of computer instructions that are relevant to the counter includes filtering the subsequent occurrences of execution of the set of computer instructions based on an execution mode of the computer instructions and on a tag associated with a location in a memory that the computer instructions were fetched from, wherein the tag indicates that the location in the memory is associated with one of an operating system code and a user application code,
    wherein the execution mode is one of a kernel mode and an user mode.

2. The computer-implemented method of claim 1 wherein a subsequent occurrence of execution of the at least one computer instruction in the set of computer instructions occurs within a threshold relative to a prior execution of the at least one computer instruction.

3. The computer-implemented method of claim 2 wherein the threshold comprises a threshold time period following the prior execution of the at least one computer instruction.

4. The computer-implemented method of claim 1 wherein the execution mode of the at least one computer instruction is architecture specific.

5. The computer-implemented method of claim 1 wherein filtering the subsequent occurrences of execution of the set of computer instructions based on the execution mode of the computer instructions includes removing subsequent occurrences of execution of the set of computer instructions executed in the kernel mode as not being relevant.

6. A computer system for determining characteristics of a computer program by identifying execution characteristics of computer instructions, the computer system comprising a processor configured to:
    identify a set of computer instructions;
    identify an execution of at least one computer instruction of the set of computer instructions;
    determine which subsequent occurrences of execution of computer instructions in the set of computer instructions that are relevant to a counter based on execution characteristics of the computer instructions; and
    count the subsequent occurrences of execution of each of the computer instructions in the set of computer instruction that were determined to be relevant following the executions of the at least one computer instruction,
    wherein determining which subsequent occurrences of execution of computer instructions in the set of computer instructions that are relevant to the counter includes filtering the subsequent occurrences of execution of the set of computer instructions based on an execution mode of the computer instructions and on a tag associated with a location in a memory that the computer instructions were fetched from, wherein the tag indicates that the location in the memory is associated with one of an operating system code and a user application code,
    wherein the execution mode is one of a kernel mode and an user mode.

7. The computer system of claim 6 wherein the counter counts each subsequent occurrence of execution of at least one computer instruction occurring within a threshold relative to prior executions of the at least one computer instruction.

8. The computer system of claim 6 wherein the execution mode of the at least one computer instruction is architecture specific.

9. The computer system of claim 6 wherein filtering the subsequent occurrences of execution of the set of computer instructions based on the execution mode of the computer instructions includes removing subsequent occurrences of execution of the set of computer instructions executed in the kernel mode as not being relevant.

10. A computer program product comprising a computer readable storage medium having program instructions embodied therewith, the program instructions executable by a computer processor to cause the computer processor to perform a method for determining characteristics of a computer program by identifying execution characteristics of computer instructions, the method comprising:
    identifying a set of computer instructions;
    identifying an execution of at least one computer instruction of the set of computer instructions;
    determining which subsequent occurrences of execution of computer instructions in the set of computer instructions that are relevant to a counter based on execution characteristics of the computer instructions; and counting the subsequent occurrences of execution of each of the computer instructions in the set of computer instruction that were determined to be relevant following the executions of the at least one computer instruction, wherein determining which subsequent occurrences of execution of computer instructions in the set of computer instructions that are relevant to the counter includes filtering the subsequent occurrences of execution of the set of computer instructions based on an execution mode of the computer instructions and on a tag associated with a location in a memory that the computer instructions were fetched from, wherein the tag indicates that the location in the memory is associated with one of an operating system code and a user application code, wherein the execution mode is one of a kernel mode and an user mode.

11. The computer program product of claim 10 wherein the execution mode of the at least one computer instruction is architecture specific.

12. The computer program product of claim 10 wherein filtering the subsequent occurrences of execution of the set of computer instructions based on the execution mode of the computer instructions includes removing subsequent occurrences of execution of the set of computer instructions executed in the kernel mode as not being relevant.

* * * * *